(12) United States Patent
Lockwood

(10) Patent No.: US 6,575,307 B2
(45) Date of Patent: Jun. 10, 2003

(54) SELF-CLEANING WATER FILTER

(75) Inventor: George H. Lockwood, Pompano Beach, FL (US)

(73) Assignee: Rain Bird Corporation, Glendora, CA (US)

( * ) Notice: Subject to any disclaimer, the term of this patent is extended or adjusted under 35 U.S.C. 154(b) by 13 days.

(21) Appl. No.: 09/975,283

(22) Filed: Oct. 10, 2001

(65) Prior Publication Data

US 2002/0040868 A1 Apr. 11, 2002

Related U.S. Application Data

(60) Provisional application No. 60/238,542, filed on Oct. 10, 2000.

(51) Int. Cl.[7] .......................... B01D 29/64; B01D 35/02
(52) U.S. Cl. .................... 210/413; 210/414; 210/416.1; 210/436; 210/459
(58) Field of Search ................................ 210/407, 408, 210/409, 411, 412, 413, 414, 416.1, 416.3, 418, 436, 437, 443, 459, 472

(56) References Cited

U.S. PATENT DOCUMENTS

| | | | |
|---|---|---|---|
| 3,357,567 A | | 12/1967 | Wake |
| 3,550,775 A | * | 12/1970 | Cooley ........................ 210/770 |
| 3,623,607 A | | 11/1971 | Loos |
| 3,653,348 A | | 4/1972 | Bumhaft |
| 3,754,651 A | | 8/1973 | Lannoch |
| 3,850,802 A | | 11/1974 | Berger |
| 3,959,140 A | | 5/1976 | Legras |
| 4,003,837 A | * | 1/1977 | Osborne ...................... 210/408 |
| 4,019,984 A | * | 4/1977 | Mohn .......................... 210/770 |
| 4,039,452 A | | 8/1977 | Fernandez |
| 4,045,345 A | | 8/1977 | Drori |
| 4,060,483 A | | 11/1977 | Barzuza |
| 4,217,116 A | | 8/1980 | Seever |
| 4,271,018 A | | 6/1981 | Drori |
| 4,278,540 A | | 7/1981 | Drori |
| 4,337,158 A | | 6/1982 | Bodine |
| 4,655,910 A | | 4/1987 | Tabor |
| 4,655,911 A | | 4/1987 | Tabor |
| 4,818,402 A | | 4/1989 | Steiner et al. |
| 4,919,801 A | | 4/1990 | Hobson, Jr. |
| 5,074,999 A | | 12/1991 | Drori |
| 5,192,429 A | | 3/1993 | Bader |
| 5,228,993 A | | 7/1993 | Drori |
| 5,312,544 A | | 5/1994 | Kinney |
| 5,389,243 A | | 2/1995 | Kaplan |
| 5,401,396 A | | 3/1995 | Lescovich et al. |
| 5,560,820 A | | 10/1996 | Consolo |
| 5,584,314 A | * | 12/1996 | Bron .......................... 137/239 |
| 5,670,038 A | | 9/1997 | McKinney |
| 5,804,072 A | | 9/1998 | Yang |
| 5,830,347 A | | 11/1998 | Vollmer |
| 5,979,304 A | * | 11/1999 | Norais ......................... 100/37 |
| 6,110,388 A | * | 8/2000 | Norais et al. ................ 210/770 |

FOREIGN PATENT DOCUMENTS

| | | | |
|---|---|---|---|
| EP | 1245258 | * | 10/2002 |
| JP | 11-57336 | * | 3/1999 |

* cited by examiner

*Primary Examiner*—Fred Prince
(74) *Attorney, Agent, or Firm*—John D. Bauersfeld; Kelly Bauersfeld Lowry & Kelley, LLP

(57) ABSTRACT

A self-cleaning water filter assembly including a body having inlet and outlet portions and a filter housing portion defining a cavity disposed therebetween so that water entering the inlet must flow through an inner surface to an outer surface of a filter then to the outlet. A piston disposed concentrically within the filter is biased in an upward resting position by a spring in the absence of water pressure. A scraper extends radially from a piston sidewall and into contact with the inner surface of the filter. Apertures extend through the sidewall and into a central bore extending through a bottom end of the piston. In the presence of water pressure, the piston is forced downwardly into the cavity, and the scraper and apertures cooperatively dislodge and flush filtered particulate matter from the housing. As water pressure is reduced, the piston is biased into its upward resting position, dislodging and flushing filtered particulate matter again.

16 Claims, 4 Drawing Sheets

SELF-CLEANING WATER FILTER

RELATED APPLICATION

This application claims priority from Provisional Application Serial No. 60/238,542, filed Oct. 10, 2000.

BACKGROUND OF THE INVENTION

The present invention generally relates to filter devices for filtering particulate matter from a water stream used in irrigation systems. More particularly, the present invention relates to a water filter installed down stream of a control valve and adapted for automatic removal of accumulated particulate matter therefrom in response to cyclic on/off supply of the water stream.

Water filters are used in a wide range of different applications to collect and remove particulate matter from a water flow stream. U.S. Pat. No. 4,360,037 to Kendall, discloses a self-cleaning filter assembly for use in solenoid-actuated valves having fluid pressure-operated diaphragms that control the opening and closing of the valve. Such solenoid-actuated valves includes small passageways leading to a control chamber, requiring the filtering of the water control stream to prevent the blockage of the small passageways. The Kendal device utilizes a plurality of rigid scraper blades urged under spring force into scraping contact with an upstream surface of the filter each time the valve is opened or closed. However, the Kendall device described above filtered only the control stream which served to actuate the valve, leaving the irrigation stream untreated.

Water filters are also employed in irrigation systems to filter out fine particulate and debris which may be present in the water supply, to prevent such particulate matter from passing to sprinkler heads or low-flow emitter devices, such as drip hoses, where such particulate matter can obstruct or otherwise interfere with the delivery of the irrigation water at selected rates to surrounding vegetation. Such filters have typically included a filter medium designed to collect particulate of a target fine mesh size wherein pressure drop across the filter medium is directly proportional to the quantity of the particulate collected thereon. Since an excessive pressure drop across the filter medium can significantly reduce water flow and thereby adversely impact the performance of the irrigation system, the filter medium must be periodically cleaned and the accumulated particulate removed.

In the past, changing or cleaning of the filter medium has generally required manual intervention to access and expose the filter medium. Brushing devices have been devised which contact the filter medium to dislodge the particulate matter from the filter medium so that it can discharged to a disposal area. However, such previously used devices have required manual operation or external additional mechanical power and controls. Systems have been devised whereby the filter medium is back washed and the particulate matter discharged out of the system, however, these systems have been found to be excessively complicated, requiring additional equipment, expense, and maintenance labor.

Accordingly, there is a continuing need for a self-cleaning water filter device which is placed down stream from a control valve and which filters the irrigation water stream. The present invention fulfills this need and provides other related advantages.

SUMMARY OF THE INVENTION

The present invention resides in a self-cleaning water filter assembly which automatically cleans and back washes a filter thereof with each on and off cycle of an upstream control valve.

The water filter assembly generally comprises a body having inlet and outlet portions through which water can flow. An elongated filter housing portion is disposed between the inlet and the outlet portions and defines a filter housing cavity having top and bottom ends. In a particularly preferred embodiment, the housing is removably attached to the body. A generally cylindrical seat is formed at the junction between the inlet and the top end of the cavity. A flush opening is formed through the bottom end of the cavity for discharging particulate flow into the atmosphere.

A generally cylindrical filter is disposed concentrically within the filter housing cavity between the inlet and the outlet so that water from the inlet flows from an inner surface of the filter to an outer surface of the filter and then to the outlet.

A generally cylindrical and elongated piston is disposed concentrically within the filter and is axially movable relative to the filter between upper and lower positions within the cavity in response to the pressure of pressurized water at the inlet. The piston has a generally cylindrical sidewall interconnecting upper and lower ends thereof. An axially directed bore extends internally from adjacent the upper end to the lower end of the piston. At least one, and preferably two scrapers are attached to the piston adjacent to the upper end thereof so as to project radially outwardly of the piston sidewall into frictional engagement with the inner surface of the filter to dislodge particulate matter as the piston is moved. Typically, the scrapers are generally cylindrical and comprised of a resiliently flexible material. At least one aperture extends adjacent the upper end of the piston between the scrapers and through the sidewall to the piston bore to channel the dislodged particulate matter through the bore to the flush openings of the housing. A vertically oriented aperture may be formed through a top surface of the piston and into the bore to direct particulate back wash above the piston into the bore.

A spring concentrically surrounds the piston and is supported at a lower end by the housing, and at an upper end by the piston to bias the piston toward the upper position within the cavity so that the piston engages the valve seat in the absence of water pressure.

A seal projects upwardly from the bottom end of the housing cavity and is adapted to seal the piston bore when the piston is in the lower position, resulting in the blockage of particulate flow to the housing flush openings.

When the water is turned off, the spring biases the piston towards its upward position within the cavity, resulting in the dislodgement of particulate matter and debris from the inner surface of the filter. The residual water pressure flushes this debris through the apertures of the piston, into the piston bore, and out of the flush openings of the housing cavity. Thus, the filter is cleaninned with each on and off cycle of the irrigation system, preventing filter clogging.

Other features and advantages of the present invention will become apparent from the following more detailed description, taken in conjunction with the accompanying drawings which illustrate, by way of example, the principles of the invention.

DETAILED DESCRIPTION OF THE PREFERRED EMBODIMENT

Figure 1:
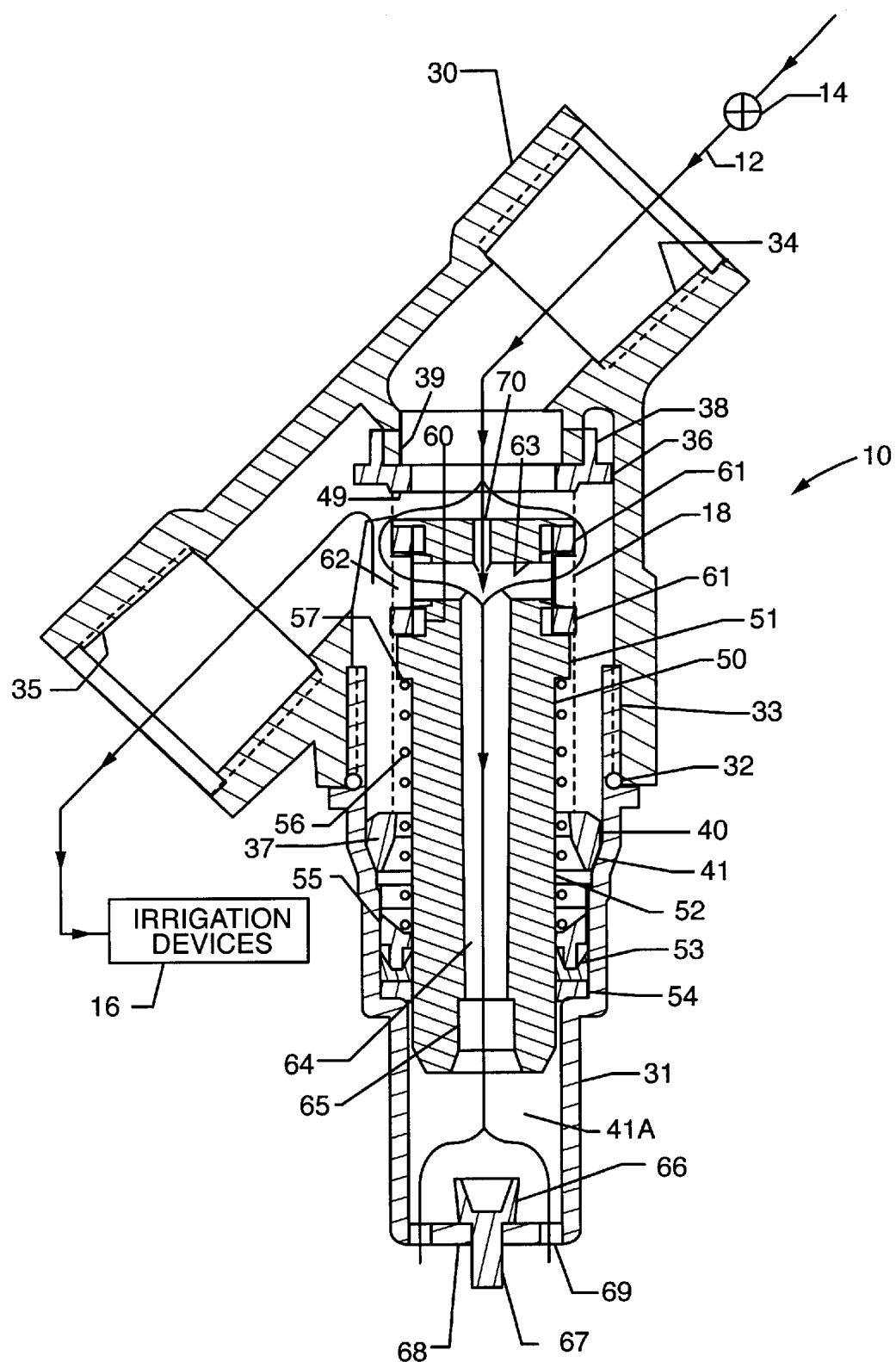
FIG. 1 is a cross-sectional view of a self-cleaning water filter cartridge embodying the present invention under little water pressure.

As shown in the drawings for purposes of illustration, the present invention is concerned with a self-cleaning water filter assembly generally referred to by the reference number 10. The water filter assembly 10 is installed within an irrigation line downstream of an on/off control valve 14, yet upstream of irrigation devices 16 such as sprinkler heads or low flow emitter devices, so that particulate matter from the irrigation fluid flow stream 12 is filtered to prevent the clogging of small passages and orifices of the irrigation devices 16.

With reference to FIG. 1, a body 30 is provided for insertion of the filter assembly 10 into the irrigation line. The body 30 includes a first end defining an inlet having internal threads 34 or the like for connection to the irrigation line. Similarly, a second end of the body 30 defining an outlet has internal threads 35 or other means for connecting to the irrigation line.

The filter housing 31 is preferably removable attached to the body 30 by engaging external threads 33 of the housing 31 with an internally threaded section of the body 30. As the filter housing 31 is screwed into place, an O-ring 32 provided a watertight seat between the body 30 and the filter housing 31.

A hollow, generally cylindrical filter screen 18 is located and retained in the cavity formed by the assembly of the body 30 and the filter housing 31. The filter screen may be comprised of either plastic or metallic material having a mesh opening as dictated by the particular application. The filter screen includes an upper end support 36 and a lower end support 37 which may be comprised of plastic and molded directly onto or otherwise bonded onto the filter material. The upper cylindrical end 38 of the screen 18 is slidably fitted to a body projection 39. The lower filter end support 37 is slidably fitted into the bore 41 of the filter housing. As can be seen in the accompanying drawings, the water stream 12 flows into the inside of the filter screen 18, passes through the screen 18 and is discharged through the outlet of the body 30.

In order to remove particulate matter that accumulates on the filter screen 18 over time, a piston 50 is slidably disposed within the filter screen 18. In a particularly preferred embodiment, the piston 50 is generally cylindrical to match the shape of the filter screen 18, although it will be understood by the reader that other cross-sectional geometry such as square, hexagonal, etc. can be used depending on the cross-sectional shape of the filter screen. The piston 50 has an upper end 51 of enlarged diameter, and a top surface engageable with a generally cylindrical shaped seat 49 formed by a lower edge of the filter screen upper end support 36. An elongated body 52 extends downwardly from the upper end 51 and is held, in part, in proper alignment by an annular seal 53, which also prevents water from passing therebetween. The seal 53 is held in place between washers 54 and 55.

Figure 2:
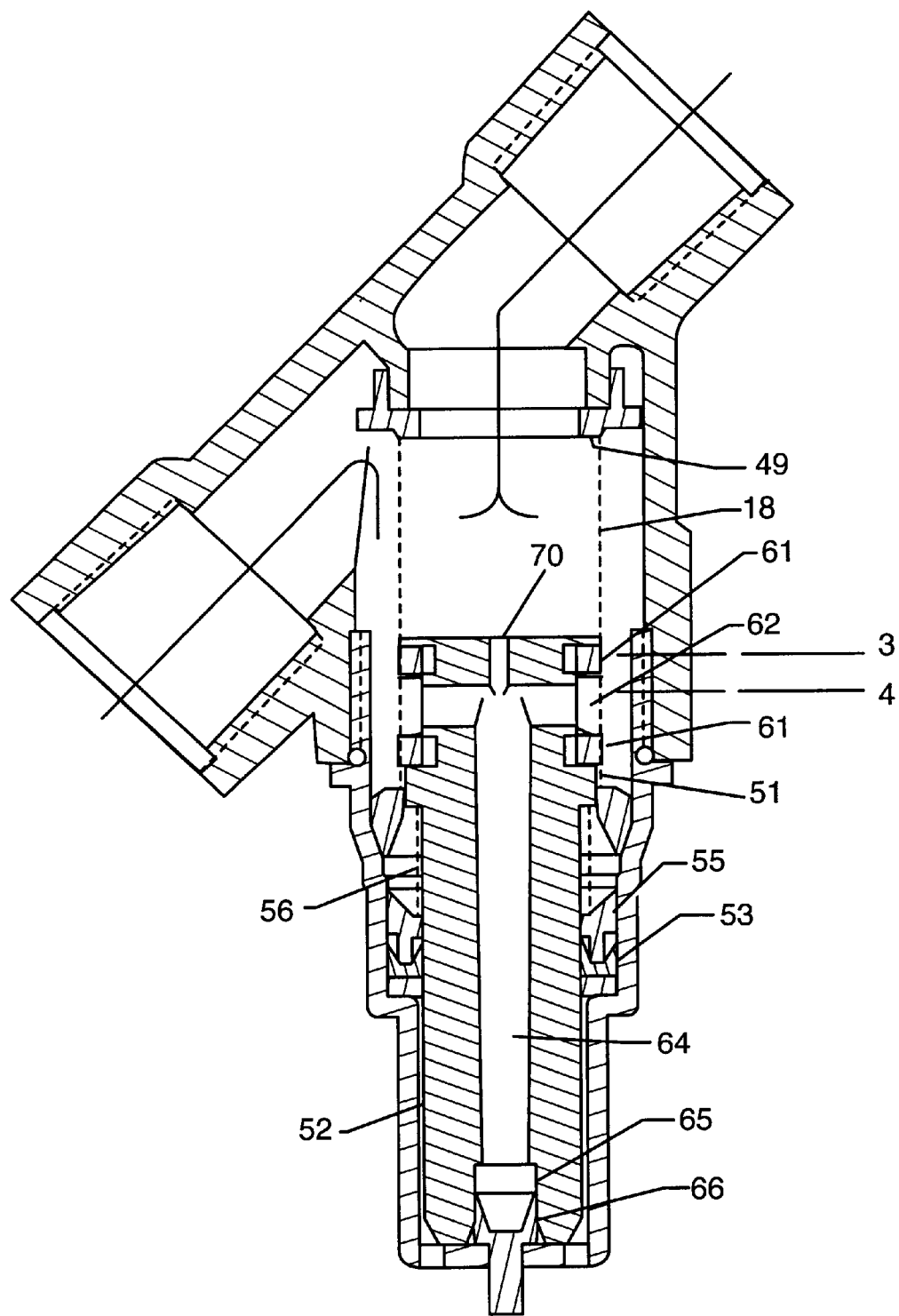
FIG. 2 is a cross-sectional view of water filter cartridge of FIG. 1 under increased water pressure.

The piston 50 is biased into an upward position by a spring 56 encircling the piston body 52 and interposed between washer 55 and a shoulder 57 formed between the junction of the enlarged upper piston end 51 and the smaller piston body 52. When no water pressure is present at the inlet of the filter assembly 10, the piston 50 is biased in an uppermost resting position, with the piston top surface engaged with the seat 49. When the control valve 14 is turned on, pressurizing water enters the inlet of the filter assembly 10 and the piston 50 is increasingly pushed down into the housing cavity 41A which is vented to atmosphere by vent holes 69 until moved a full stroke the length of the filter screen 18. This moves the spring 56 to a compressed position, as illustrated in FIG. 2.

Figure 2A:
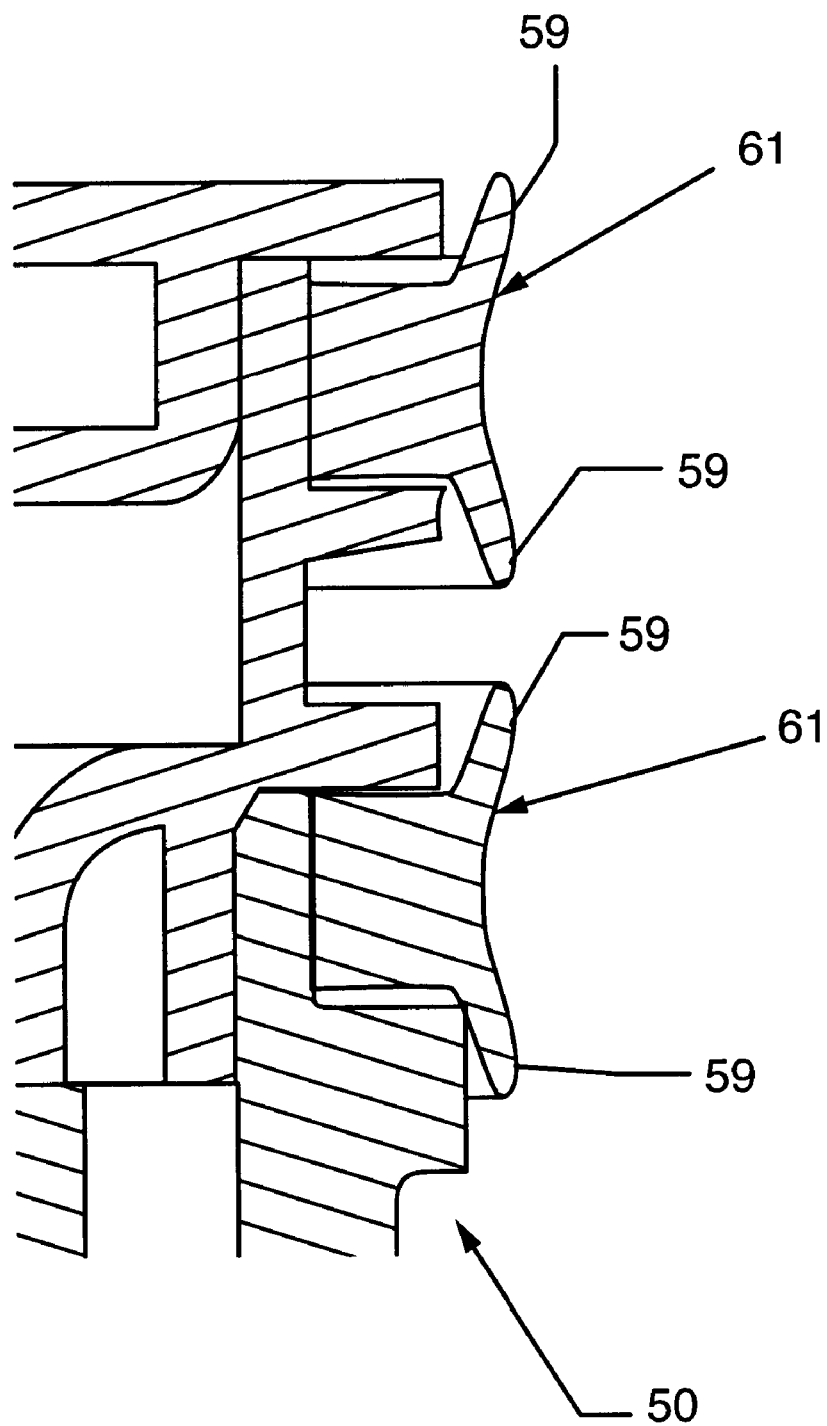
FIG. 2A is an enlarged and fragmented cross-sectional view of a surface configuration of scrapers used in accordance with the present invention.
Figure 3:
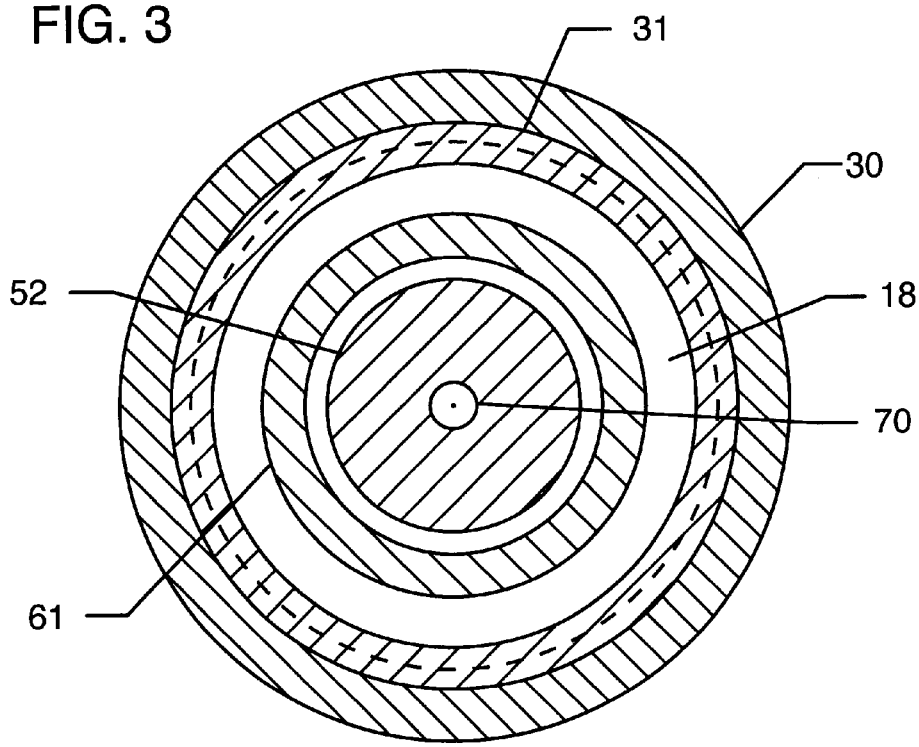
FIG. 3 is a partial cross-sectional view taken generally along line "3"
Figure 4:
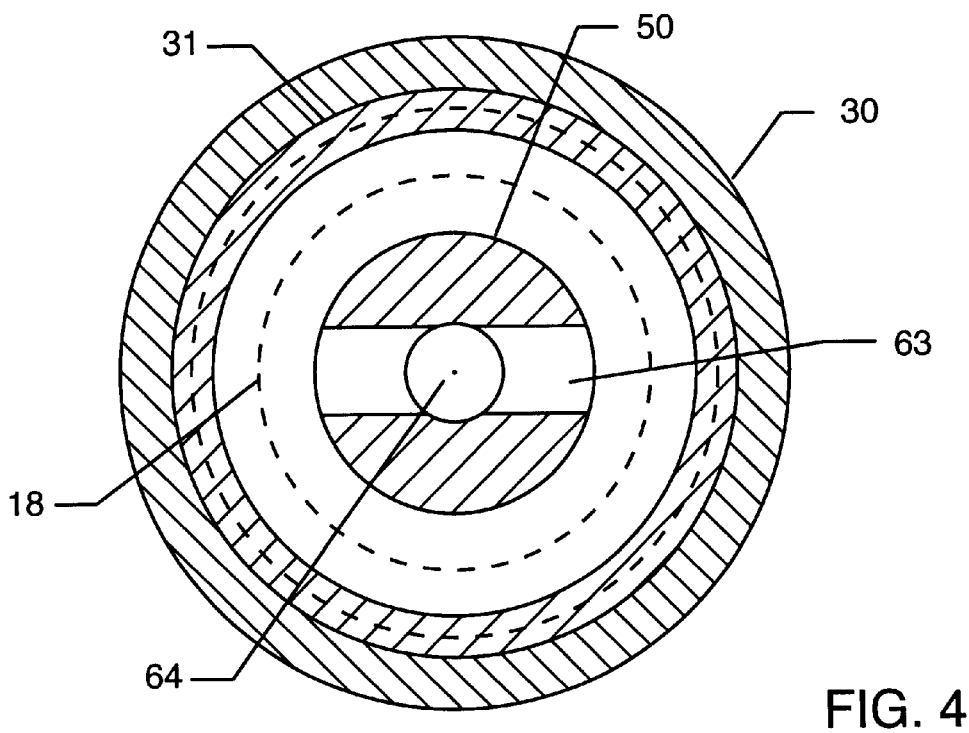
FIG. 4 is a partial cross-sectional view taken generally along line "4".

Two axially spaced apart grooves 60 are circumferentially formed around the exterior surface of the upper end of the piston 51. Generally cylindrical scrapers 61 are inserted into the grooves so as to extend radially beyond the exterior surface of the piston 50 and into frictional contact with the internal surface of the filter 18, as shown in FIGS. 3 and 4. Preferably, the scrapers 61 are comprised of a resiliently flexible material, such as rubber or plastic and are formed as longitudinally split rings that can be snap-fit into the grooves 60. Although the outer surface of the scrapers 61 are illustrated as square, it should be appreciated that the other exterior surface configurations are possible as long as the scraper 61 is capable of removing particulate matter from the interior surface of the filter screen 18. A particularly preferred exterior surface configuration of the scrapers 61 is shown in FIG. 2A, wherein the surface contacting edges 59 of the scraper 61 extend towards the filter screen 18 at an angle from the scraper ring 61.

A third circumferential groove 62 is located between the scraper 60. At least one and preferably two opposing apertures 63 are formed through the groove 62 and into a bore 64, which extends the length of the piston 50 and terminates in an outlet 65.

When the control valve 14 is turned on, water pressure increases within the filter assembly 10, moving the piston 50 downward. During the downward motion of the piston, the scrapers 61 remove collected particulate from the inside of the filter screen 18. As shown by the flow arrows in FIG. 1, the incoming water flows through the filter screen 18 and increases the pressure on the outside of the filter screen 18. The pressure in the groove 62 however remains at or neat atmosphere by reason of the apertures 63 and the bore 64 exhausting into the vented housing cavity 41A. Because of the pressure on the outside of the screen 18 is higher than the pressure groove 62, water flows through the screen 18 from outside to inside thereby backwashing particulate from the screen 18 into the groove 62 and is ultimately discharged through the vents 69 in the housing cavity 41A. This action continues during the entire stroke of the piston 50. At the end of the piston 50 down stroke, the seal plug 68 located in the bottom of housing cavity 41A enters the outlet 65 of the bore 64 and the discharging of water and particulate is stopped.

When the control valve 14 is turned off, the water pressure subsides, resulting in the spring 56 biasing the piston 50 upwardly towards seat 49. On this upward travel, similar to the downward travel, the scrapers 61 contact the internal surfaces of the filter 18 and remove accumulated filtered particulate matter from the filter screen 18. As there is still reduced pressure in the system, the particulate matter is forced into groove 62 and through apertures 63 by the remaining water in the assembly 10 and into the piston bore 64 where the particulate flow is dumped into the housing cavity 41A and allowed to flow into the atmosphere through discharge apertures 69. Thus, the filter 18 is automatically cleaned on every on and off cycle of the irrigation system.

It is possible that particulate matter either not caught in the filter 18 or removed from the filter on the upward travel of the piston 50 remains above the piston 50. In order to properly discharge this particulate matter, a vertically oriented aperture 70 is formed through the top surface of the piston 50 and into the piston bore 64.

Although an embodiment has been described in detail for purposes of illustration, various modifications may be made without departing from the scope and spirit of the invention. Accordingly, the invention is not to be limited, except as by the appended claims.

What is claimed is:

1. A self-cleaning water filter assembly, comprising:
   a body having an inlet portion and an outlet portion through which pressurized water can flow, and an elongated filter housing portion disposed between the inlet and the outlet and defining an elongated filter housing cavity having top and bottom ends, the housing having a generally cylindrical seat formed at the junction of the inlet and the top end of the cavity, and a flush opening formed through the bottom end of the cavity;
   a generally cylindrical filter disposed within the filter housing cavity between the inlet and the outlet, the filter having an inner surface and an outer surface and disposed within the cavity such that water from the inlet flows from the inner surface to the outer surface then to the outlet;
   a generally cylindrical elongated piston disposed concentrically within the filter and axially movable relative to the filter in response to the pressure of pressurized water at the inlet between an upper and lower position within the cavity, the piston having an upper end and a lower end interconnected by a cylindrical sidewall, an axially directed bore extending internally adjacent the upper end to the lower end, at least one aperture extending from adjacent the upper end of the piston through the sidewall to the bore, and at least one scraper attached to the piston adjacent to the upper end of the piston and projecting radially outwardly of the sidewall into frictional engagement with the inner surface of the filter;
   a spring concentrically surrounding the piston and supported at a lower end by the housing and at an upper end by the piston, the spring biasing the piston toward the upper position with the upper end in engagement with the seat; and
   a seal at from the bottom end of the housing cavity and adapted to seal the bore when the piston is in the lower position;
   whereby upon the introduction of water pressure with the assembly, the piston is moved downwardly into the housing cavity resulting in the dislodgement and flushing of debris and particulate matter from the inner surface of the filter until the bore is sealed, and upon the reduction of water pressure, the piston is biased upwardly towards the seat resulting in the dislodgement and flushing of debris and particulate matter from the inner surface of the filter until the piston engages the seat.

2. The water filter assembly of claim 1, wherein the housing portion is removably attached to the body.

3. The water filter assembly of claim 1, wherein the scraper is generally cylindrical.

4. The water filter assembly of claim 3, wherein the scraper is retained within a groove circumferentially formed adjacent to the upper end of the piston.

5. The water filter assembly of claim 1, wherein the scraper is resiliently flexible.

6. The water filter assembly of claim 5, wherein the scraper comprises two generally cylindrical scrapers disposed circumferentially on an outer surface of the piston adjacent the upper end and axially space apart from one another so that the at least one piston sidewall aperture lies between the scrapers.

7. The water filter assembly of claim 1, including an aperture extending vertically through a top surface of the piston and into the bore.

8. The water filter assembly of claim 7, wherein the at least one sidewall aperture comprises two opposing apertures extending through the sidewall and into the bore.

9. The water filter cartridge of claim 8, wherein the cross-sectional area of the bore is approximately equal to the sum of the cross-sectional areas of the vertical aperture and the sidewall apertures.

10. A self-cleaning water filter assembly comprising:
    a body having a inlet portion and an outlet portion through which pressurized water can flow, and an elongated filter housing portion disposed between the inlet and the outlet and defining an elongated filter housing cavity having top and bottom ends, the housing having a generally cylindrical seat formed at the junction of the inlet and the top end of the cavity, and a flush opening formed through the bottom end of the cavity;
    a generally cylindrical filter disposed within the filter housing cavity between the inlet and the outlet, the filter having an inner surface and an outer surface and disposed within the cavity such that water from the inlet flows from the inner surface to the outer surface then to the outlet;
    a generally cylindrical elongated piston disposed concentrically within the filter and axially movable relative to the filter in response to the pressure of pressurized water at the inlet between an upper and lower position within the cavity, the piston having an upper end and a lower end interconnected by a cylindrical sidewall, an axially directed bore extending internally adjacent the upper end to the lower end, a first generally cylindrical scraper attached to the piston adjacent to the upper end of the piston and projecting radially outwardly of the sidewall into frictional engagement with the inner surface of the filter, a second generally cylindrical scraper attached to the piston adjacent to the upper end of the piston and projecting radially outwardly of the sidewall into frictional engagement with the inner surface of the filter and axially spaced from the first scraper, opposing apertures extending from adjacent the upper end of the piston between the first and second scrapers through the sidewall to the bore, and an aperture extending vertically through a top surface of the piston and into the bore;
    a spring concentrically surrounding the piston and supported at a lower end by the housing and at an upper end by the piston, the spring biasing the piston toward the upper position with the upper end in engagement with the seat; and
    a seal at from the bottom end of the housing cavity and adapted to seal the bore when the piston is in the lower position;
    whereby upon the introduction of water pressure within the assembly, the piston is moved downwardly into the housing cavity resulting in the dislodgement and flushing of debris and particulate matter from the inner surface of the filter until the bore is sealed, and upon the reduction of water pressure, the piston is biased upwardly towards the seat resulting in the dislodgement and flushing of debris and particulate matter from the inner surface of the filter until the piston engages the seat.

11. The water filter assembly of claim 10, wherein the housing portion is removably attached to the body.

12. The water filter assembly of claim 10, wherein the scrapers are retained within grooves circumferentially formed adjacent to the upper and of the piston.

13. The water filter assembly of claim 10, wherein the scrapers are resiliently flexible.

14. The water filter cartridge of claim 10, wherein the cross-sectional area of the bore is approximately equal to the sum of the cross-sectional areas of the vertical aperture and the sidewall apertures.

15. A self-cleaning water filter assembly, comprising:

a body having an inlet portion and an outlet portion through which pressurized water can flow, and an elongated filter housing portion removably disposed between the inlet and the outlet and defining an elongated filter housing cavity having top and bottom ends, the housing having a generally cylindrical seat formed at the junction of the inlet and the top end of the cavity, and a flush opening formed through the bottom end of the cavity;

a generally cylindrical filter disposed within the filter housing cavity between the inlet and the outlet, the filter having an inner surface and an outer surface and disposed within the cavity such that water from the inlet flows from the inner surface to the outer surface then to the outlet;

a generally cylindrical elongated piston disposed concentrically within the filter and movable in response to the pressure of pressurized water at the inlet between an upper and lower position within the cavity, the piston having an upper end and a lower end interconnected by a cylindrical sidewall, an axially directed bore extending internally adjacent the upper end to the lower end, a first generally cylindrical and resiliently flexible scraper retained within a groove circumferentially formed adjacent to the upper end of the piston and projecting radially outwardly of the sidewall into frictional engagement with the inner surface of the filter, a second generally cylindrical and resiliently flexible scraper retained within a groove circumferentially formed adjacent to the upper end of the piston and projecting radially outwardly of the sidewall into frictional engagement with the inner surface of the filter and axially spaced from the first scraper, opposing apertures extending from adjacent the upper end of the piston between the first and second scrapers through the sidewall to the bore, and an aperture extending vertically through a top surface of the piston and into the bore;

a spring concentrically surrounding the piston and supported at a lower end by the housing and at an upper end by the piston, the spring biasing the piston toward the upper position with the upper end in engagement with the seat; and a seal projecting upwardly from the bottom end of the housing cavity and adapted to seal the bore when the piston is in the lower position;

whereby upon the introduction of water pressure within the assembly, the piston is moved downwardly into the housing cavity resulting in the dislodgement and flushing of debris and particulate matter from the inner surface of the filter until the bore is sealed, and upon the reduction of water pressure, the piston is biased upwardly towards the seat resulting in the dislodgement and flushing of debris and particulate matter from the inner surface of the filter until the piston engages the seat.

16. The water filter cartridge of claim 15, wherein the cross-sectional area of the bore is approximately equal to the sum of the cross-sectional areas of the vertical aperture and the sidewall apertures.

* * * * *